US008956090B2

(12) United States Patent
Kuchler

(10) Patent No.: US 8,956,090 B2
(45) Date of Patent: *Feb. 17, 2015

(54) MILLING CUTTER AND METHOD OF OPERATING SAME, AND OTHER MACHINE TOOLS, AND AN ADJUSTMENT MECHANISM THEREFOR

(75) Inventor: Rainer Kuchler, Wilhermsdorf (DE)

(73) Assignee: Kennametal Inc., Latrobe, PA (US)

( * ) Notice: Subject to any disclaimer, the term of this patent is extended or adjusted under 35 U.S.C. 154(b) by 1130 days.

This patent is subject to a terminal disclaimer.

(21) Appl. No.: 12/911,760

(22) Filed: Oct. 26, 2010

(65) Prior Publication Data

US 2011/0038676 A1   Feb. 17, 2011

Related U.S. Application Data

(63) Continuation of application No. 11/948,660, filed on Nov. 30, 2007, now Pat. No. 7,841,812, and a continuation-in-part of application No. PCT/EP2006/003777, filed on Apr. 25, 2006.

(30) Foreign Application Priority Data

Jun. 1, 2005   (DE) .......................... 10 2005 025 000

(51) Int. Cl.
*B23B 51/00*   (2006.01)
*B23B 29/034*   (2006.01)
*B23C 5/10*   (2006.01)
*B23C 5/24*   (2006.01)

(52) U.S. Cl.
CPC ........... *B23B 29/03421* (2013.01); *B23C 5/109* (2013.01); *B23C 5/2493* (2013.01); *B23B 2205/125* (2013.01); *B23B 2250/04* (2013.01); *B23B 2270/06* (2013.01); *Y10S 408/714* (2013.01)
USPC ........... 408/224; 408/156; 408/153; 408/714; 407/37; 407/45

(58) Field of Classification Search
USPC .......... 407/36–39, 44–45; 408/154–156, 714, 408/153, 181, 223–225, 231, 233
IPC ........................................................ B23C 5/24
See application file for complete search history.

(56) References Cited

U.S. PATENT DOCUMENTS 3,675,290 A * 7/1972 Mayer ............................ 407/37
3,834,829 A   9/1974 Munro
4,040,156 A * 8/1977 Tack ............................... 407/44

(Continued)

FOREIGN PATENT DOCUMENTS

DE   724 5822 A       3/1973
DE   3316053 A1 *    11/1984

(Continued)

OTHER PUBLICATIONS

International Search Report PCT/EP2006/003777 and English translation thereof.

*Primary Examiner* — Daniel Howell
(74) *Attorney, Agent, or Firm* — Larry R. Meenan, Esq.

(57) ABSTRACT

Milling cutter and method of operating same, and other machine tools, and an adjustment mechanism therefor. A cutting insert is adjusted by moving a resilient web with an adjusting screw.

17 Claims, 8 Drawing Sheets

(56) References Cited

U.S. PATENT DOCUMENTS

| | | | |
|---|---|---|---|
| 4,225,274 A | 9/1980 | Katz | |
| 4,563,113 A | 1/1986 | Edenhoch | |
| 5,102,269 A | 4/1992 | Arai et al. | |
| 5,217,330 A | 6/1993 | Dennstedt | |
| 5,391,023 A | 2/1995 | Basteck | |
| 5,735,649 A | 4/1998 | Boscarino et al. | |
| 6,033,157 A | 3/2000 | Satran et al. | |
| 6,056,484 A | 5/2000 | Mitchell et al. | |
| 7,841,812 B2 * | 11/2010 | Kuchler | 408/224 |
| 2003/0099519 A1 | 5/2003 | Robinson et al. | |

FOREIGN PATENT DOCUMENTS

| | | | |
|---|---|---|---|
| DE | 393 6243 A | | 5/1991 |
| DE | 197 40 410 A | | 5/1999 |
| DE | 10 250 018 A | | 5/2004 |
| EP | 0 703 030 A | | 3/1996 |
| EP | 0 713 739 A | | 5/1996 |
| FR | 2 125 227 A | | 9/1972 |
| JP | 08039330 A | * | 2/1996 |
| RU | 2066601 C1 | * | 9/1996 |
| SU | 1569101 A | * | 6/1990 |
| SU | 1690968 A1 | * | 11/1991 |
| WO | 00/07762 A1 | | 2/2000 |
| WO | 01/26854 A1 | | 4/2001 |
| WO | 02/062513 A1 | | 8/2002 |
| WO | 2004037473 A2 | | 5/2004 |

* cited by examiner

MILLING CUTTER AND METHOD OF OPERATING SAME, AND OTHER MACHINE TOOLS, AND AN ADJUSTMENT MECHANISM THEREFOR

CONTINUING APPLICATION DATA

This application is a Continuation application of application Ser. No. 11/948,660, filed Nov. 30, 2007, which in turn, is a Continuation-In-Part application of International Patent Application No. PCT/EP2006/003777, filed on Apr. 25, 2006, which claims priority from Federal Republic of Germany Patent Application No. 10 2005 025 000.9, filed on Jun. 1, 2005. International Patent Application No. PCT/EP2006/003777 was pending as of the filing date of this application. The United States was an elected state in International Patent Application No. PCT/EP2006/003777.

BACKGROUND

1. Technical Field

This application relates to a milling cutter and method of operating same, and other machine tools, and an adjustment mechanism therefor.

2. Background Information

For metal-cutting machining of workpieces, both rotating tools, such as, for example, drills or milling cutters, and non-rotating tools, such as, for example, turning or firmer chisels are used.

In the manufacture of high-precision workpieces, a precise radial positioning of the cutting elements is often of decisive importance. Such as with rotating tools, the cutting elements being typically exchangeable cutting inserts which, according to the respective application, can also be designed as indexable inserts. The use of ground indexable inserts, which are very expensive, can be omitted when the fine-adjustment mechanism is used. In that case, one can use finish-sintered and, therefore, more cost-advantageous indexable inserts.

One example of a known milling tool with a fine-adjustment mechanism for the radial position of a cutting insert has a groove extending obliquely to the longitudinal axis of the tool and over the entire width of the tool is incorporated. In addition, a longitudinal slot is arranged centrally in the tool base body, crossing the bottom of the groove. An adjusting screw can be screwed into the groove from outside in radial direction, whereby the front part of the tool base body, on which the cutting insert is fastened, is bent outwards in radial direction. The groove and the longitudinal slot weaken the tool base body, so that the stability is impaired. Furthermore, this measure, by which the entire front portion of the tool base body is bent, allows the radial adjustment of one cutting insert only.

Another example of a known milling tool includes several cutting inserts, each of which is fastened on the tool base body by means of a cassette. The cassette itself again includes the groove and a slot extending across the bottom of the groove and having a circular cross-section. Here, too, a screw is screwed into the groove to fix the radial position. However, through the additional arrangement of a cassette, the required mounting space is relatively large and the number of required parts and their respective space requirements are high. With small tools, this variant is, therefore, unsuited.

A further example of a known fine-adjustment mechanism for a milling tool includes several adjusting portions distributed over the periphery of the base body, which are separated from the central base body through expanding openings and connected with the central base body through two marginal material bridges. Each of the adjusting portions carries a cutting insert. In radial direction, two supporting screws each pass through the adjusting portion, said screws resting against an eccentric roller extending in longitudinal direction. The fine positioning of the cutting insert is effected in this case by an adjustment of the eccentric roller acting against the supporting screws, so that these screws and with them, the entire adjusting portion is pushed radially outwards. Due to the chosen construction, the adjusting portion must be of solid design to guarantee sufficient stability. Therefore, this example is not suitable either for tools with small diameters.

There is also a known example of an arrangement of a clamping screw in a slot incorporated in the tool base body for clamping a cutting element in an insert seat. Here, however, no fine adjustment in radial direction, but only a clamping of the cutting insert is provided.

OBJECT OR OBJECTS

It is an object of at least one possible embodiment of the present application to provide a tool holder with a fine-adjustment mechanism for the radial position of a cutting element, achieving altogether a very compact structure and, at the same time, a sufficiently high stability, so that the fine-adjustment mechanism is suited also for tools with small outer diameters.

SUMMARY

The object of at least one possible embodiment of the present application is achieved by a tool holder for a cutting element, for example, a cutting insert, with a tool base body extending along a longitudinal axis, and said tool base body being provided with a fine-adjustment mechanism for the radial position of the cutting element and including an insert seat for fastening the cutting element. In at least one possible embodiment of the present application, the insert seat includes a supporting face, against which the cutting element is clamped. It is open towards a cutting side and has a rear bearing wall opposite to the cutting side. To form the fine-adjustment mechanism, the bearing wall is designed, through incorporation of an expanding slot, as a resiliently held web, which is connected with the remaining tool base body only on a fastening side. A tapered-head screw can be screwed into the expanding slot for fine adjustment.

By designing the bearing wall as a resilient flexible or deformable web in the form of a flat, thin adjusting plate, a very space-saving structure is achieved. To achieve a compact embodiment, the cutting element is fastened directly on the tool base body. Furthermore, the expanding slot is incorporated immediately adjacent or essentially immediately adjacent to the insert seat and spaced from it only by the thin web. The tool base body is only very slightly weakened, so that the overall stability is only very little influenced. Therefore, a radial positioning with compact structure and high stability is achieved. To cause the least possible weakening, in at least one possible embodiment of the present application, the expanding slot has a width in the range of only about 0.5 to 1 mm.

The arrangement of the expanding slot close to the insert seat, and the relatively thin-walled web, enable, upon actuation of the adjusting screw, an adjustment of the radial position with relatively little effort. The area of the tool base body to be adjusted by the screw is only the web resiliently held on the fastening side, which possesses only a relatively small mass. Therefore, the adjusting screw can also be dimensioned in a correspondingly fine manner, which altogether contributes to a compact structure.

To form the web, in at least one possible embodiment of the present application, the expanding slot includes a longitudinal leg as well as a transverse leg extending approximately at right angles to it. Therefore, viewed in cross-section, the expanding slot is, at least approximately, L-shaped. Therefore, the web is separated from the remaining tool base body on at least two sides through the longitudinal leg and the transverse leg. In at least one possible embodiment, the length of the transverse leg corresponds approximately to the wall thickness of the web and forms the connection from the rear longitudinal leg to the insert holder.

According to an expedient embodiment, the longitudinal leg is parallel or essentially parallel to the bearing wall. In this case, the expanding slot has one or two transverse legs. In the case of two transverse legs, these are arranged opposite to each other on the longitudinal leg, approximately at right angles, so that the web is separated from the remaining tool base body on three sides and is only connected with it with a fastening side.

In an advantageous alternative development, the expanding slot starts on one of the corner holes of the sup-porting face and extends obliquely to the bearing wall, so that, viewed in cross-section, a wedge-shaped web is formed.

To weaken the tool base body as little as possible, the expanding slot extends only approximately over the insert-seat width of the insert seat. As the expanding slot is only provided for separating the web forming the bearing wall and no other parts of the tool base body have to be bent resiliently, the relatively short slot over the insert-seat width is sufficient for the desired radial fine adjustment.

In at least one possible embodiment of the present application, the web has a wall thickness in the range of about 1.5 mm to 2.5 mm only. With this small wall thickness, the web can be adjusted against the resilient restoring forces with only little effort, so that a very fine adjustment is possible. At the same time, the central area of the tool base body is hardly weakened.

In at least one possible embodiment of the present application, the supporting face is provided with a tapped hole for screwing in a fastening screw passing through the cutting element, for the cutting element. Therefore, the cutting element is secured in mounted condition directly by the fastening screw. No further clamping element, such as a clamping jaw or the like, is provided.

According to a first alternative embodiment, the fastening side of the web extends along the supporting face. Therefore, the web is connected with the tool base body at the bottom of the insert seat.

According to a second alternative embodiment, the fastening side of the web extends along a lateral bearing wall of the insert seat. The lateral bearing wall forms a bearing face for the indexable cutting insert. Therefore, the fastening side of the web extends vertically to the supporting face. The transverse leg of the expanding slot extends on the level of the supporting face up to the clearance of the insert seat and, therefore, separates the web from the bottom (supporting face) of the insert seat.

In order to enable a high-precision and very finely dosable adjustment, the expanding slot expediently extends up to an expanding-slot depth reaching beyond an insert-seat level defined by one of the bearing walls of the insert seat. The bearing wall is, for example, the before-mentioned lateral bearing wall or else the supporting face. If the bearing wall is a lateral bearing wall, the expanding slot will extend slightly beyond the insert-seat width. If the bearing wall is the supporting face, the expanding slot will end below the supporting face. Through this measure, the resilient restoring force is influenced. In at least one possible embodiment of the present application, the expanding slot extends only approximately 1 mm to 2.5 mm beyond the insert-seat level.

For a further defined adjustment of the resilient restoring force, an additional expanding slot is provided according to at least one possible embodiment of the present application, which is oriented parallelly or essentially parallelly to the expanding slot and is incorporated on that side of the web which faces towards the insert seat. Through this measure, the flection edge of the web is shifted, for example, below the level of the supporting face, whereby, due to the extended "flection arm" on the level of the supporting face, a larger adjusting range is achieved. In at least one possible embodiment of the present application, the additional expanding slot extends beyond the expanding-slot depth. To achieve an adjusting range as large as possible, in at least one possible embodiment of the present application it is also provided that the additional expanding slot is inclined towards the expanding slot, so that an acute or approximately acute angle is defined between these two slots. In at least one possible embodiment of the present application, this acute angle lies in the range of approximately 5 to 15°.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the following, some embodiments of the present application are explained in detail by means of the drawing wherein, in each case in sectional representation.

DESCRIPTION OF EMBODIMENT OR EMBODIMENTS

In the figures, parts having the same function are designated with the same reference numbers.

Figure 1A:
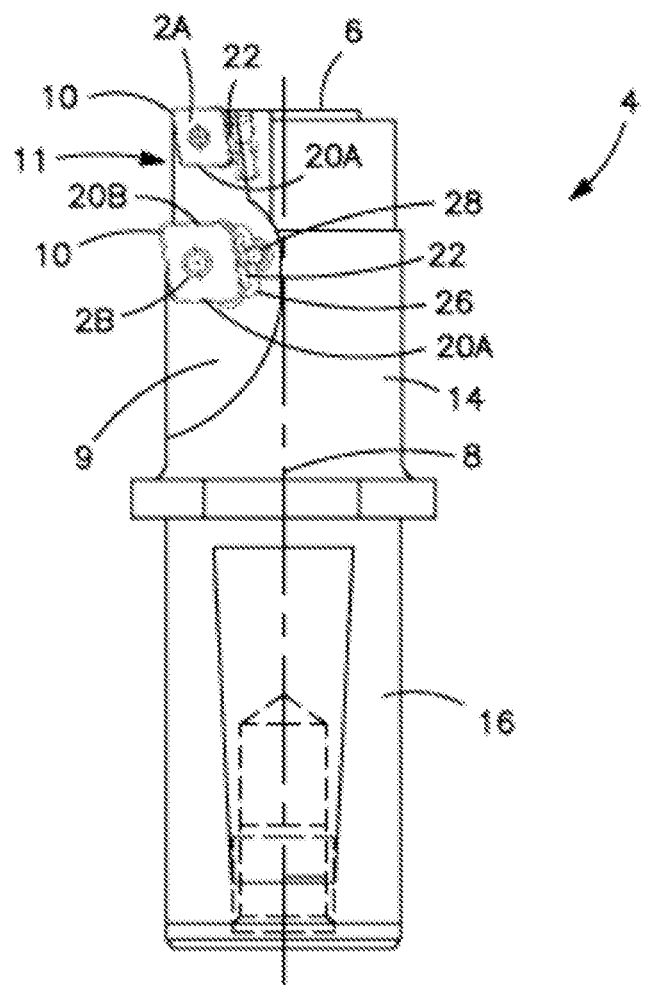
FIG. 1A shows a side view of a countersinking tool with cutting inserts arranged offset against each other in axial direction.
Figure 1B:
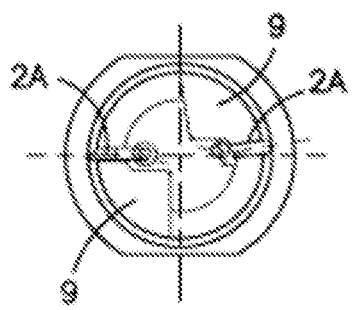
FIG. 1B shows a view of the face of the countersinking tool according to FIG. 1A.

One example of a fine-adjustment mechanism for radial positioning of a cutting insert 2A,B is explained by means of the countersinking tool 4 shown in FIGS. 1A, 1B. In principle, the fine-adjustment mechanism can be applied to all tool types, such as to rotating tools with exchangeable cutting inserts 2, such as, for example, milling cutters, reamers, countersinking and boring tools.

As can be seen from FIGS. 1A, 1B, the countersinking tool 4 includes two front cutting inserts 2A, turned relative to each other by approximately 180° and arranged directly on the front face 6 of the countersinking tool 4. Two additional cutting inserts 2B are set back in axial or longitudinal direction 8, arranged in a common chip space 9 with the cutting inserts 2A and also turned relative to each other by approximately 180°. Each cutting insert 2A,2B has a cutting corner 10 which is oriented towards a cutting side 11, namely the periphery. When machining a workpiece, the cutting corners 10 of the cutting inserts 2A, 2B are in engagement with the workpiece. The cutting corners 10 of the cutting inserts 2A,2B are arranged in different radial positions, with the rear, larger cutting inserts 2B defining a larger circumference. By radial direction, one understands here in general a direction which is vertical to the longitudinal axis 8. The cutting inserts 2A,2B are directly fastened to a tool base body 14 by means of a clamping screw 12. The tool base body will in the following briefly be referred to as base body 14. The base body 14 includes in its rear area a shank 16 which during operation is secured in a machine tool and set in a rotational motion about its central axis of rotation by means of a spindle.

The countersinking tool 4 finishes, for example, an existing hole for a sealing seat, with the front cutting inserts 2A enlarging the cylindrical surface to the specified dimension and the following cutting inserts 2B, which are axially set back, further enlarging the diameter of the hole by an exact dimension in an upper partial area. The hole is finished so that a step is formed onto which, for example, a sealing element is inserted with precise fit.

The cutting inserts 2A,2B are secured in an insert seat. The latter is formed by a supporting face 18 (cf., for example, FIGS. 2A,3A,4B, 5B) of at least one lateral bearing wall 20A,B as well as a rear bearing wall formed by a resiliently held web 22. Opposite to the web 22, the insert seat is open towards the cutting side 11, i.e. it does not have any bearing or limiting wall there. The insert seat for the cutting insert 2B has two lateral bearing walls 20A,B, whereas the insert seat for the cutting insert 2A is substantially open towards the face 6, too.

The web 22 is a plate-like element, which is connected with the remaining base body 14 on a fastening side only by means of a connection web 24 (cf. FIGS. 2A,3A,4A, 5). The web 22 is a partial area of the base body 14 separated by an expanding slot 26.

An adjusting screw 28 is provided for adjusting the radial position of the cutting inserts 2A,2B. Said screw is screwed into a tapped hole 30A. The expanding slot 26 crosses the tapped hole 30A, so that, when the adjusting screw 28 is screwed in, the expanding slot 26 is opened and the web 22 is pushed outwards in radial direction.

The tapped hole 30A is worked into the tool base body 14 before the expanding slot 26 is formed, for example, by means of a ram erosion process. As can be seen from FIG. 1A, the adjusting screw 28 for the cutting insert 2B is screwed into the expanding slot 26 in radial direction, while the adjusting screw 28 for the cutting insert 2A is screwed in from the face 6, approximately in longitudinal direction 8. Therefore, two adjusting variants are possible, either from top or, turned by 90°, from the face 6.

Figure 2A:
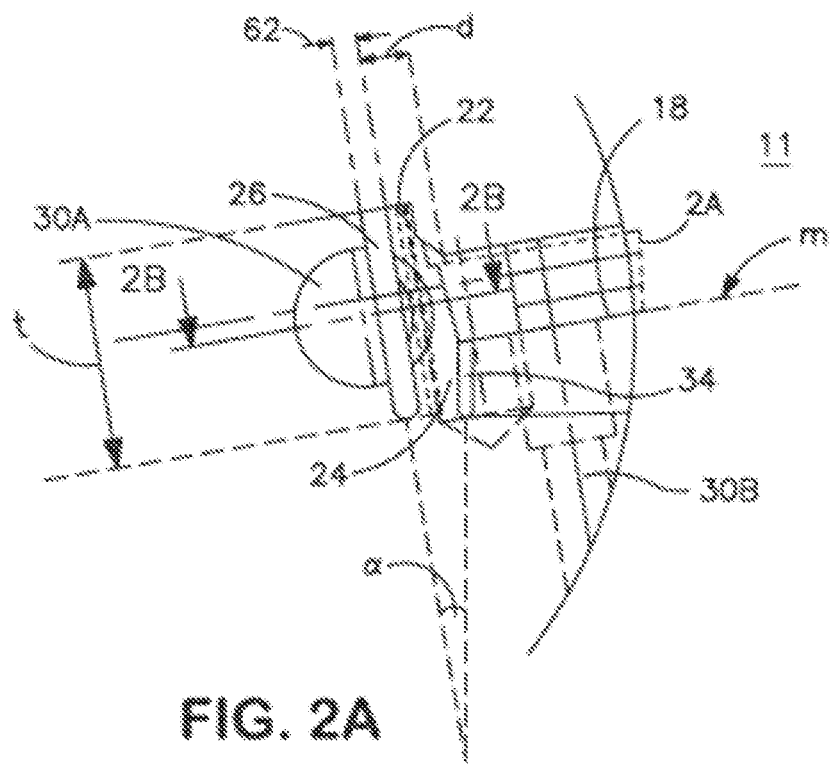
FIGS. 2A,2B show a first embodiment variant of the fine-adjustment mechanism, FIG. 2A being a partial plan view of the face view according to FIG. 1B and FIG. 2B being a sectional view approximately parallel to the longitudinal axis along the line 2B-2B in FIG. 2A.
Figure 2B:
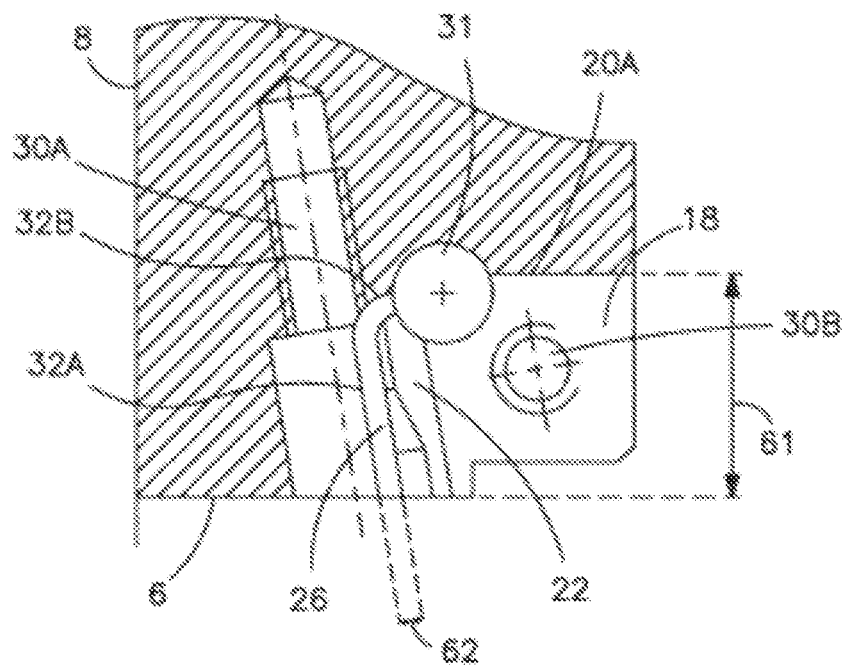
Figure 3A:
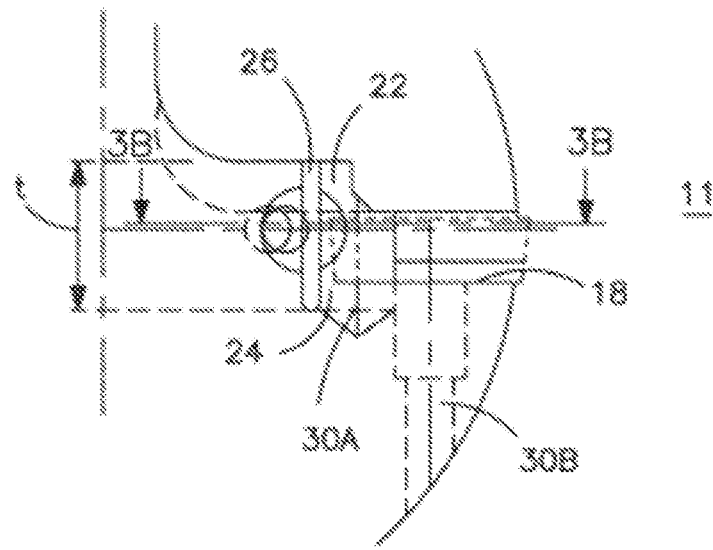
FIGS. 3A,3B show a second embodiment example of the fine-adjustment mechanism, FIG. 3A being, analogously to FIG. 2A, a view of the face according to FIG. 1B and FIG. 3B being a sectional view approximately parallel to the longitudinal axis along the line 3B-3B according to FIG. 3A.
Figure 3B:
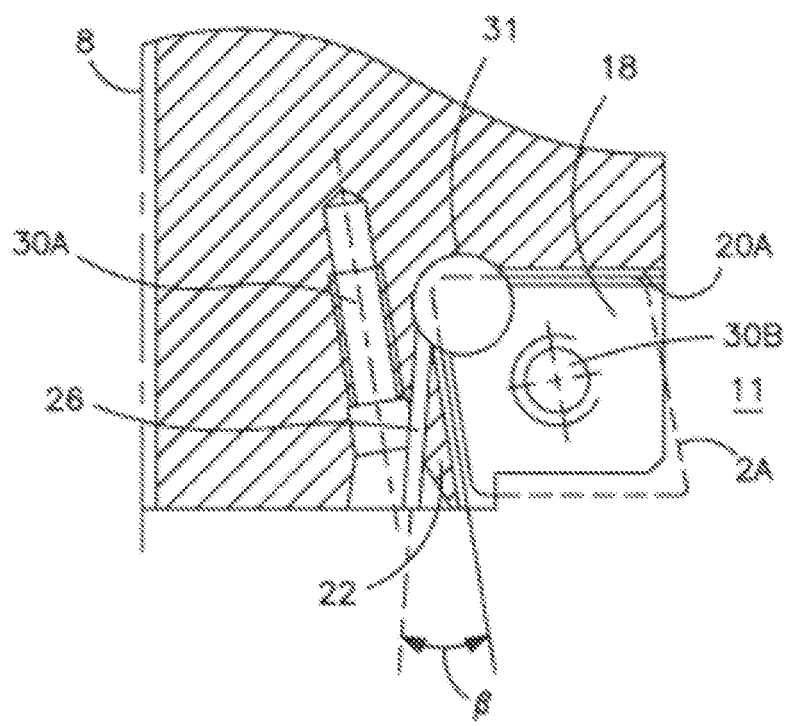
Figure 4A:
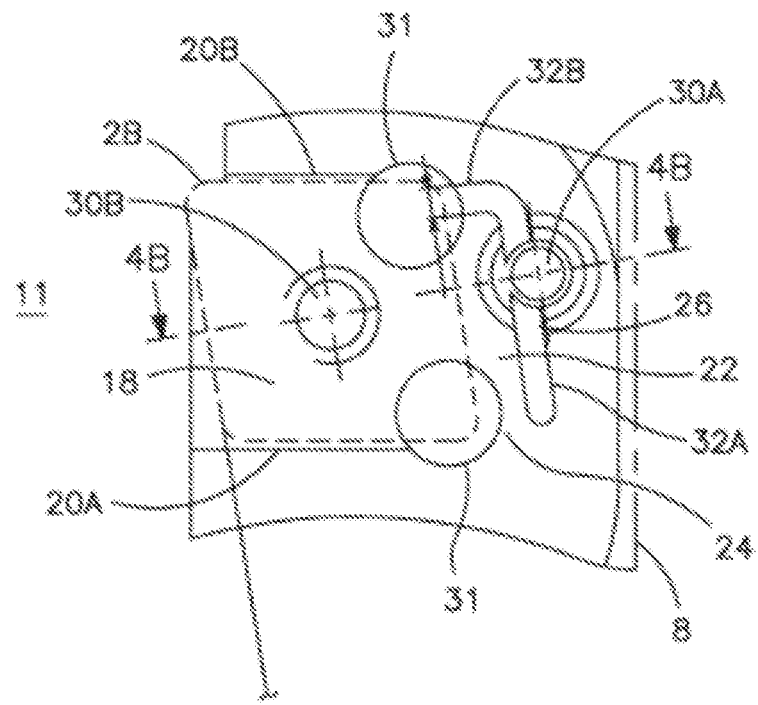
FIGS. 4A,4B show a third embodiment example of the fine-adjustment mechanism, FIG. 4A being a lateral view of a cutting insert set back against the face in axial direction, like the one shown in FIG. 1A, and FIG. 4B being a section approximately at right angles to the longitudinal axis along the line 4B-4B according to FIG. 4A.
Figure 5A:
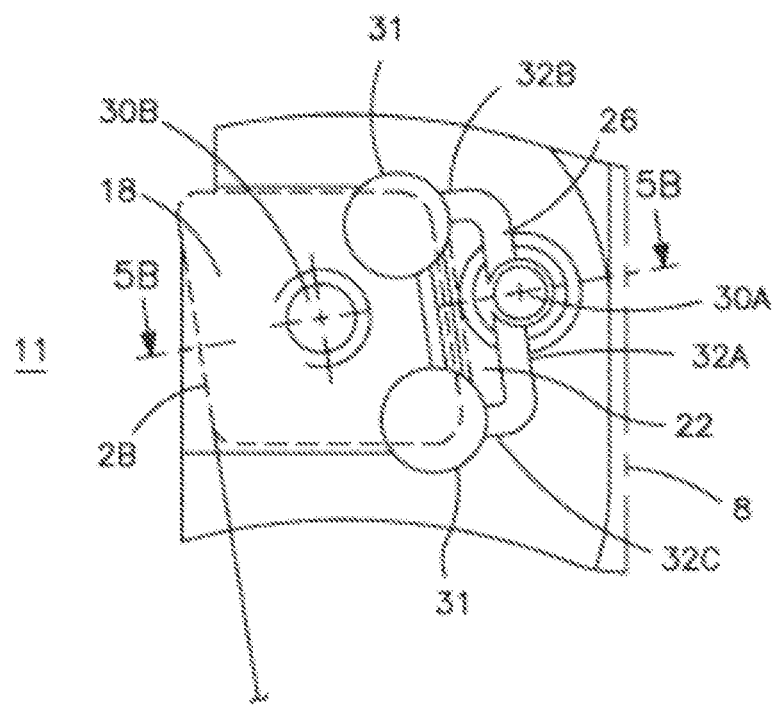
FIGS. 5A,5B show a fourth embodiment example of a fine-adjustment mechanism, FIG. 5A being, similar to FIG. 4A, a lateral view of the cutting insert set back, shown in FIG. 1A, and FIG. 5B being a sectional view approximately vertically to the longitudinal axis along the line 5B-5B according to FIG. 5A.

As can be seen from FIGS. 2B, 3B, 4A as well as from FIG. 5A, the insert seat includes corner holes 31 in the direction towards the web 22. The corner holes 31 are usually produced by drilling when forming the insert seat. In doing so, some material is also removed from the supporting face 18, so that the circular traces visible in the figures result.

A first embodiment example—in the following referred to as variant A will now be explained by means of FIGS. 2A, 2B. As can be seen from the sectional view of FIG. 2B, the expanding slot 26 is formed by a longitudinal leg 32A as well as by a transverse leg 32B. The longitudinal leg 32A is parallel or essentially parallel to the bearing wall for the cutting insert 2A (shown in FIG. 2A by a dashed line) formed by the web 22. The transverse leg 32B adjoins the longitudinal leg 32A approximately at right angles by a 90° bend and extends up to the front-side clearance of the insert seat, with the longitudinal leg 32A starting at the front face 6 of the base body 14 and corresponding approximately to one insert-seat width 61. The expanding slot 26 itself has a slot width 62 in the range of approximately 0.5 to 1 mm. The web 22 formed by the expanding slot 26 has a wall thickness d in the range of approximately 1.5 mm to 2.5 mm. The expanding slot 26 has an expanding-slot depth t. In the embodiment example of FIGS. 2A,2B, this depth t corresponds to an approximately radial penetration depth vertically to the longitudinal axis 8, the depth t being such that the expanding slot 26 extends beyond an insert-seat level m defined in the embodiment example of FIGS. 2A,2B by the supporting face 18.

In addition to the expanding slot 26, an additional expanding slot 34 is arranged, which is worked into the base body 14 on the corner edge between the supporting face 18 and the web 22. The additional expanding slot 34 extends on the one hand approximately in radial direction and on the other hand along the edge between the supporting face 18 and the web 22. In radial direction, the additional expanding slot 34 is oriented at an angle of inclination α which amounts to about 12° in the embodiment example. An additional tapped hole 30B is worked into the supporting face 18 itself, serving for receiving the clamping screw 12.

As can be seen from FIG. 2B, the tapped hole 30A extends, starting from the face 6, in oblique orientation to the longitudinal direction 8, into the base body 14. The expanding slot 26 intersects the tapped hole 30A eccentrically on the face 6. The tapped hole 30A includes in a head area and a conical tapered bearing face for a screw head 36 of the adjusting screw 28, which is formed complementary to it (cf. FIG. 6).

The embodiment example according to FIGS. 3A, 3B, in the following referred to as variant B, differs from the variant A substantially by the omission of the additional expanding slot 34 as well as by an oblique orientation of the expanding slot 26. In this embodiment example, the expanding slot 26 is designed such that it extends obliquely to the rear bearing wall of the insert seat, formed by the web 22, and defines with the latter an acute angle β. In this case, too, the expanding slot 26 starts at the face 6 and ends at the rounded corner hole 31 of the insert seat. Therefore, in this embodiment variant, the transverse leg 32B is omitted because of the oblique design. Therefore, this embodiment variant is characterized by a relatively simple manufacture, as only one straight expanding slot 26 has to be formed.

In the embodiment examples of FIGS. 4A, 4B (in the following referred to as variant C) and of FIGS. 5A, 5B (in the following referred to as variant D), the tapped hole 30A extends from a periphery in radial direction. The expanding slot 26 also extends up to the expanding-slot depth t in radial direction.

Figure 4B:
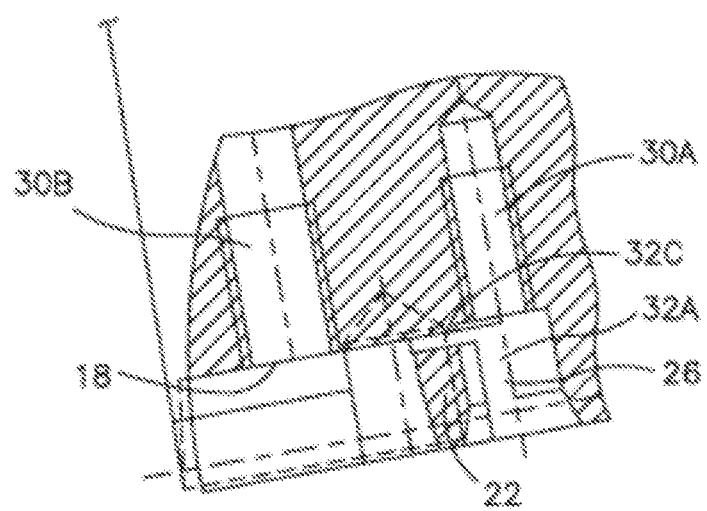
Figure 5B:
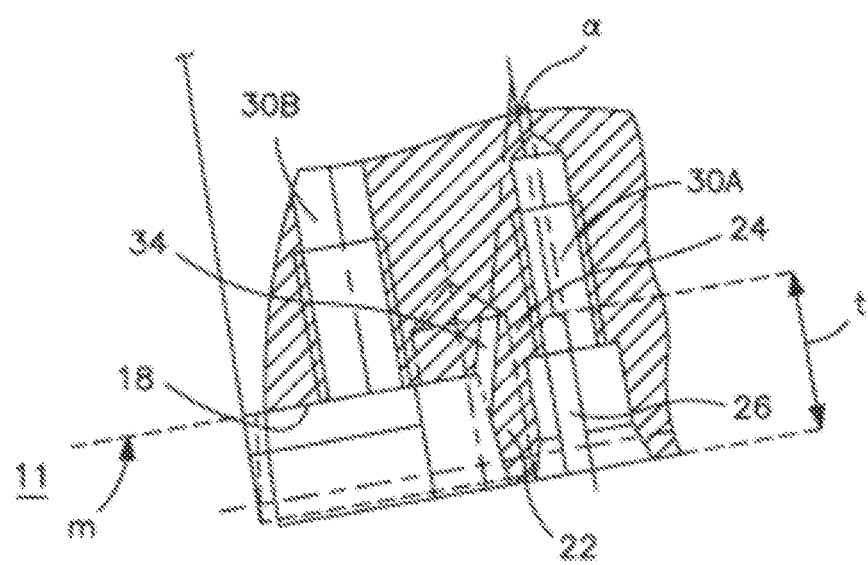

An essential difference between the two variants C and D is the fact that in variant C, according to FIGS. 4A, 4B, the connection web 24 extends laterally and in approximately vertical orientation to the supporting face 18, whereas in variant D, according to FIGS. 5A, 5B, like in variants A and B, the connection web 24 extends at the bottom of the insert seat along the supporting face 18.

As in variants C and D, the insert seat includes a second lateral bearing wall 20B in the direction of the face 6, these embodiment variants are provided with an additional point of separation between the base body 14 and the web 22. Namely, the expanding slot 26 includes, in addition to the longitudinal leg 32A, both a first transverse leg 32B and a second transverse leg 32C. In variant C according to FIGS. 4A, 4B, the first transverse leg 32B is formed as the extension of the second lateral bearing wall 20B. The second transverse leg 32C is arranged on the level of the supporting face 18 and separates the web 22 approximately at the bottom of the insert seat from the remaining base body 14.

Figure 4C:
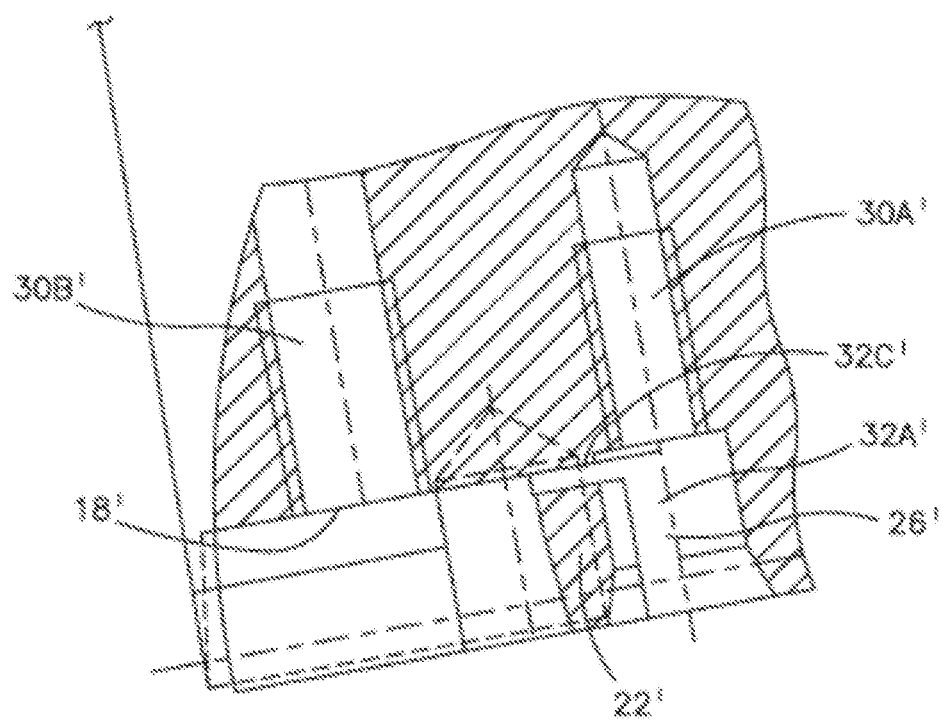
FIG. 4C shows another possible embodiment of the present application.

In the embodiment example shown in FIG. 4C, the tapped hole 30A' extends from a periphery in radial direction. The expanding slot 26' also extends up to the expanding-slot depth t (shown in FIG. 5B) in radial direction. This drawing shows the expanding slot 26' includes, in addition to the longitudinal leg 32A', a undercut transverse leg 32C'. The undercut transverse leg 32C' separates the web 22' from the base body 14 approximately at the bottom of the insert seat, connecting 32B (shown in FIG. 4A) and longitudinal leg 32A' beneath the web 22'. The undercut transverse leg 32C' frees the web 22' from the base body 14, except at the connection web 24 (shown in FIG. 4A), allowing for more flexibility in the web 22'.

In the embodiment variant D according to FIGS. 5A, 5B, the expanding slot 26 is formed in the plan view of FIG. 5A approximately like a U, each of its two transverse legs 32B, 32C opening towards the corner holes 31 of the insert seat. In this embodiment variant, again an additional expanding slot 34 is provided, extending from a corner edge between the supporting face 18 and the web 22, obliquely to the expanding slot 26, into the base body 14. Similar to the embodiment example according to FIGS. 2A, 2B, its end is arranged deeper in the base body 14, i.e. it extends more deeply into the base body 14 than the expanding slot 26.

Figure 6:
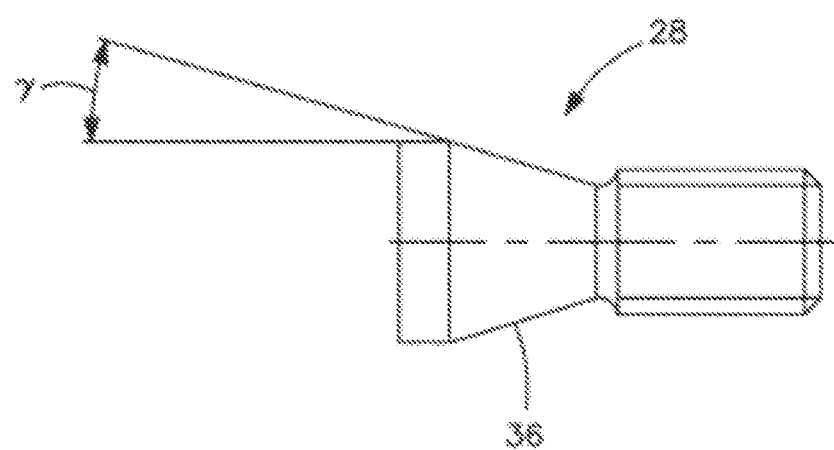
FIG. 6 shows aside view of an adjusting screw with tapered head.

With the adjusting screw 28, aside view of which is shown once more in FIG. 6, the expanding slot 26 is expanded in a defined way, so that the radial position of the cutting insert 2A, 2B is adjusted in a defined, precise and very fine manner.

The adjusting screw 28 includes the tapered screw head 36. The tapered periphery is inclined by a taper angle γ to the longitudinal axis of the screw. The expanding behavior of the expanding slot 26 is adjusted by the adjustment of this angle of inclination, which in the embodiment example amounts to about 15°. The head seating of the tapped hole 30A is formed, complementary to this angle, with a wedge angle of the same size.

Figure 7:
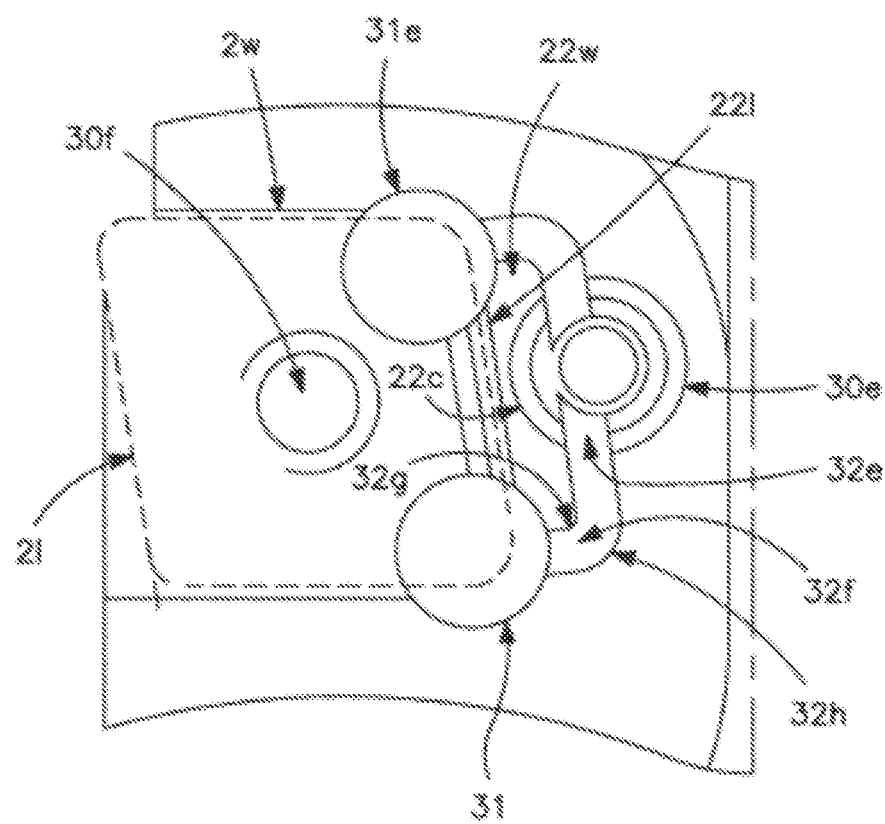
FIG. 7 shows an enlarged view of a possible embodiment example of a fine-adjustment mechanism.

FIG. 7 shows an enlarged view of a fine-adjustment mechanism and the following corresponding dimensions:
expanding slot width $32e$=approximately 5 mm
expanding slot length $32f$=approximately 20 mm
tapped hole diameter $30e$=approximately 25 mm
additional tapped hole diameter $30f$=approximately 15 mm
corner hole diameters $31e$=approximately 22.5 mm
insert width $2w$=approximately 55 mm
insert length $2l$=approximately 55 mm
web width $22w$=approximately 10 mm
web length $22l$=approximately 40 mm
web center $22c$=approximately 5 mm.

In other possible embodiments, these dimensions could vary by as much as 50%.

The following ratios denote the approximate proportional relationship of the above-mentioned dimensions to the expanding slot width $32e$:
expanding slot length $32f$=4:1
tapped hole diameter $30e$=5:1
additional tapped hole diameter $30f$=3:1
corner hole diameters $31e$=4.5:1
insert width $2w$=11:1
insert length $2l$=11:1
web width $22w$=2:1
web length $22l$=8:1
web center $22c$=1:1.

In other possible embodiments, these ratios could also vary by as much as 50%.

The present application relates to a tool holder for a cutting element with a tool base body extending along a longitudinal axis, provided with a fine-adjustment mechanism for the radial position of the cutting element and including an insert seat for fastening the cutting element. The insert seat includes a supporting face against which the cutting element is clamped, it is open towards a cutting side and has, opposite to the cutting side, a rear bearing wall.

One feature or aspect of an embodiment is believed at the time of the filing of this patent application to possibly reside broadly in a tool holder for a cutting element 2A,B with a tool base body 14 extending along a longitudinal axis 8, provided with a fine-adjustment mechanism for the radial position of the cutting element 2A,B and including an insert seat for fastening the cutting element 2A,B, the insert seat including a supporting face 18 against which the cutting element 2A,B is clamped, which is open towards a cutting side 11 and which has, opposite to the cutting side 11, a rear bearing wall which, through incorporation of an expanding slot 26, is designed as a resiliently held web 22 which is connected with the remaining tool base body 14 only on a fastening side 24, it being possible to screw in an adjusting screw 28 into the expanding slot 26 for fine adjustment of the radial position of the cutting element 2A,B, wherein the expanding slot 26 includes a longitudinal leg 32A as well as a transverse leg 32C which extends at right angles to the longitudinal leg 32A and parallel to the supporting face 18 and connects the longitudinal leg 32A with the insert seat.

The components disclosed in the various publications, disclosed or incorporated by reference herein, may possibly be used in possible embodiments of the present application, as well as equivalents thereof.

In a tool base body 14 including an insert seat for direct fastening of the cutting inserts 2A, 2B, a rear bearing wall for the cutting inserts 2A, 2B is designed as a resiliently held web 22, to enable in a tool 4 a fine adjustment of the radial position of a cutting insert 2A, 2B. For this purpose, an expanding slot 26 is incorporated in the tool base body 14 in such a way that the web 22 is connected with the remaining tool base body 14 only on a fastening side 24. An adjusting screw 28 can be screwed into the expanding slot 26 for fine adjustment. This embodiment allows a compact structure and causes only a slight impairment of the stability of the tool base body 14. Therefore, the fine-adjustment mechanism is suited also for small tools.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Another feature or aspect of an embodiment is believed at the time of the filing of this patent application to possibly reside broadly in the tool holder, wherein the longitudinal leg 32A extends parallel to the bearing wall.

The appended drawings in their entirety, including all dimensions, proportions and/or shapes in at least one embodiment of the present application, are accurate and are hereby included by reference into this specification.

Yet another feature or aspect of an embodiment is believed at the time of the filing of this patent application to possibly reside broadly in the tool holder, wherein the expanding slot 26 extends, starting at a corner hole 31 of the supporting face 18, obliquely to the bearing wall, so that, viewed in cross-section, a wedge-shaped web 22 is formed.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Still another feature or aspect of an embodiment is believed at the time of the filing of this patent application to possibly reside broadly in the tool holder, wherein the insert seat has an insert-seat width 61 and the expanding slot 26 only extends over approximately the insert-seat width 61.

All, or substantially all, of the components and methods of the various embodiments may be used with at least one embodiment or all of the embodiments, if more than one embodiment is described herein.

A further feature or aspect of an embodiment is believed at the time of the filing of this patent application to possibly reside broadly in the tool holder, wherein the web 22 has a wall thickness d in the range of approximately 1.5 mm to 2.5 mm The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Another feature or aspect of an embodiment is believed at the time of the filing of this patent application to possibly reside broadly in the tool holder, wherein the supporting face is provided with a tapped hole 30B provided for screwing in a clamping screw 12 passing through the cutting element 2A,B, for the cutting element 2A,B.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in the tool holder, wherein the fastening side 24 of the web 22 extends along a lateral bearing wall 20A of the insert seat.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in the tool holder, wherein the expanding slot 26 extends up to an expanding-slot depth reaching beyond an insert-seat level m defined by one of the bearing walls 20A, B,18 of the insert seat.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in the tool holder, wherein the expanding slot 26 extends approximately 1 mm to 2.5 mm beyond the insert-seat level n.

All of the patents, patent applications or patent publications, which were cited in the International Search Report dated Aug. 1, 2006, and/or cited elsewhere are hereby incorporated by reference as if set forth in their entirety herein as follows: WO 00/07762 A, EP 0 713 739 A, WO 01/26854A, WO 02/062513 A, EP 0 703 030 A, and DE 197 40 410 A1.

Another feature or aspect of an embodiment is believed at the time of the filing of this patent application to possibly reside broadly in the tool holder, wherein an additional expanding slot 34 is provided, which is oriented parallelly to the expanding slot 26 and is incorporated on that side of the web 22 which faces towards the insert seat.

The corresponding foreign and international patent publication applications, namely, Federal Republic of Germany Patent Application No. 10 2005 025 000.9, filed on Jun. 1, 2005, having inventor Ranier KUCHLER, and DE-OS 10 2005 025 000.9 and DE-PS 10 2005 025 000.9, and International Application No. PCT/EP2006/003777, filed on Apr. 25, 2006, having WIPO Publication No. WO 2006/128524 A1 and inventor Ranier KUCHLER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Yet another feature or aspect of an embodiment is believed at the time of the filing of this patent application to possibly reside broadly in the tool holder, wherein the additional expanding slot 34 extends beyond the expanding-slot depth t.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Still another feature or aspect of an embodiment is believed at the time of the filing of this patent application to possibly reside broadly in the tool holder, wherein the additional expanding slot 34 is inclined towards the expanding slot 26, so that an acute angle of inclination a is defined between them.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

Some examples of milling tools that may possibly be utilized or adapted for use in at least one possible embodiment may possibly be found in the following patent documents: FR 2 125 227, FR 2 125 227, DE 102 50 018A2, and US 2003/0099519 A1.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of cutting tools that may possibly be utilized or adapted for use in at least one possible embodiment may possibly be found in the following U.S. patents: U.S. Pat. No. 5,820,311, entitled "Lathe cutting tool"; U.S. Pat. No. 6,942,432, entitled "Milling cutter and insert-carrying cartridge for use therein"; U.S. Pat. No. 6,607,335, entitled "Cutting tool assembly and cutting insert therefor"; U.S. Pat. No. 7,104,735, entitled "Tangential cutting insert and milling cutter"; U.S. Pat. No. 7,008,145, entitled "Milling cutter and insert therefor" U.S. Pat. No. 5,800,100, entitled "Drilling tool with reset inserts"; and U.S. Pat. No. 5,340,246, entitled "Indexable insert drill and an insert with a symmetrical drill point and cutting edges of different lengths".

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

Some examples of cutting inserts that may possibly be utilized or adapted for use in at least one possible embodiment may possibly be found in the following U.S. patents: U.S. Pat. No. 5,810,519, entitled "Helical cutting insert with offset cutting edges"; U.S. Pat. No. 5,383,750, entitled "Exchangeable milling cutting inserts"; U.S. Pat. No. 5,071,292, entitled "Cutting insert for a milling cutting tool"; and U.S. Pat. No. 5,052,863, entitled "Cutting insert for a milling cutting tool".

The embodiments of the present application described herein above in the context of the preferred embodiments are not to be taken as limiting the embodiments of the present application to all of the provided details thereof, since modifications and variations thereof may be made without departing from the spirit and scope of the embodiments of the present application.

What is claimed is:

1. A tool holder for a cutting element, comprising:
a tool base body;
an insert seat for mounting a cutting element to the tool base body, the insert seat including a supporting face, at least one lateral bearing wall, and a rear bearing wall formed by a resiliently-held web;
two front cutting elements configured to enlarge a diameter of a hole to a desired thickness, and two rear cutting elements configured to further enlarge the diameter of the hole formed by the two front cutting inserts;

an expanding slot including a longitudinal leg and a transverse leg extending substantially perpendicular to the longitudinal leg to connect the longitudinal leg with the insert seat; and an adjusting screw for adjusting a radial position of the cutting element, the adjusting screw capable of being received in a tapped hole, the tapped hole intersecting the expanding slot such that rotation of the adjusting screw in the tapped hole causes the resiliently-held web to move radially outward, thereby effecting fine adjustment of the cutting element in a radial direction.

2. The tool holder of claim 1, wherein the two front cutting elements are disposed on a front face of the tool base body and disposed approximately 180° apart from each other, and wherein the two rear cutting elements are disposed on the tool base body at a distance from the front face of the tool base body substantially along a longitudinal axis of the tool base body and disposed approximately 180° apart from each other.

3. The tool holder of claim 1, wherein one of the front cutting elements and one of the rear cutting elements are disposed within a chip space.

4. The tool holder of claim 1, wherein each of the front cutting elements and each of the rear cutting elements include a cutting corner and a corresponding cutting side, and wherein each of the cutting corners are oriented toward its corresponding cutting side.

5. The tool holder of claim 4, wherein each of the cutting corners are configured to engage a workpiece during machining, and wherein each of the cutting sides are disposed on a periphery of the tool holder.

6. The tool holder of claim 1, wherein the expanding slot further includes an undercut extending perpendicular to the longitudinal leg and the transverse leg, and substantially parallel to the supporting face.

7. The tool holder of claim 1, further comprising a second expanding slot disposed between the supporting face and the resiliently-held web.

8. The tool holder of claim 1, wherein the resiliently-held web is connected to the tool base body by a connection web.

9. A tool holder for a cutting element, comprising:
a tool base body;
an insert seat for mounting a cutting element to the tool base body, the insert seat including a supporting face, at least one lateral bearing wall, and a rear bearing wall formed by a resiliently-held web;
two front cutting elements configured to enlarge a diameter of a hole to a desired thickness, and two rear cutting elements configured to further enlarge the diameter of the hole formed by the two front cutting inserts;
an expanding slot including a longitudinal leg; and
an adjusting screw for adjusting a radial position of the cutting element, the adjusting screw capable of being received in a tapped hole, the tapped hole intersecting the expanding slot such that rotation of the adjusting screw in the tapped hole causes the resiliently-held web to move radially outward, thereby effecting fine adjustment of the cutting element in a radial direction.

10. The tool holder of claim 9, wherein the expanding slot further includes a transverse leg extending substantially perpendicular to the longitudinal leg to connect the longitudinal leg with the insert seat.

11. The tool holder of claim 10, wherein the expanding slot further includes an undercut extending perpendicular to the longitudinal leg and the transverse leg, and substantially parallel to the supporting face.

12. The tool holder of claim 9, wherein the two front cutting elements are disposed on a front face of the tool base body and disposed approximately 180° apart from each other, and wherein the two rear cutting elements are disposed on the tool base body at a distance from the front face of the tool base body substantially along a longitudinal axis of the tool base body and disposed approximately 180° apart from each other.

13. The tool holder of claim 9, wherein one of the front cutting elements and one of the rear cutting elements are disposed within a chip space.

14. The tool holder of claim 9, wherein each of the front cutting elements and each of the rear cutting elements include a cutting corner and a corresponding cutting side, and wherein each of the cutting corners are oriented toward its corresponding cutting side.

15. The tool holder of claim 14, wherein each of the cutting corners are configured to engage a workpiece during machining, and wherein each of the cutting sides are disposed on a periphery of the tool holder.

16. The tool holder of claim 9, further comprising a second expanding slot disposed between the supporting face and the resiliently-held web.

17. The tool holder of claim 9, wherein the resiliently-held web is connected to the tool base body by a connection web.

* * * * *